April 7, 1931.  F. G. CORNELL, JR  1,799,356
HEAT EXCHANGE DEVICE
Filed April 9, 1929        2 Sheets-Sheet 2
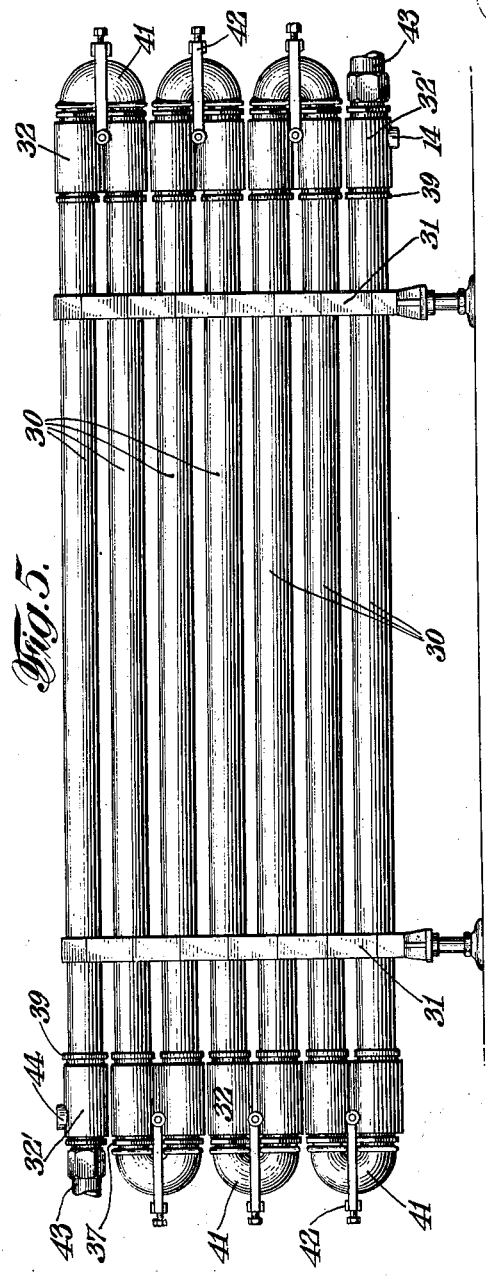
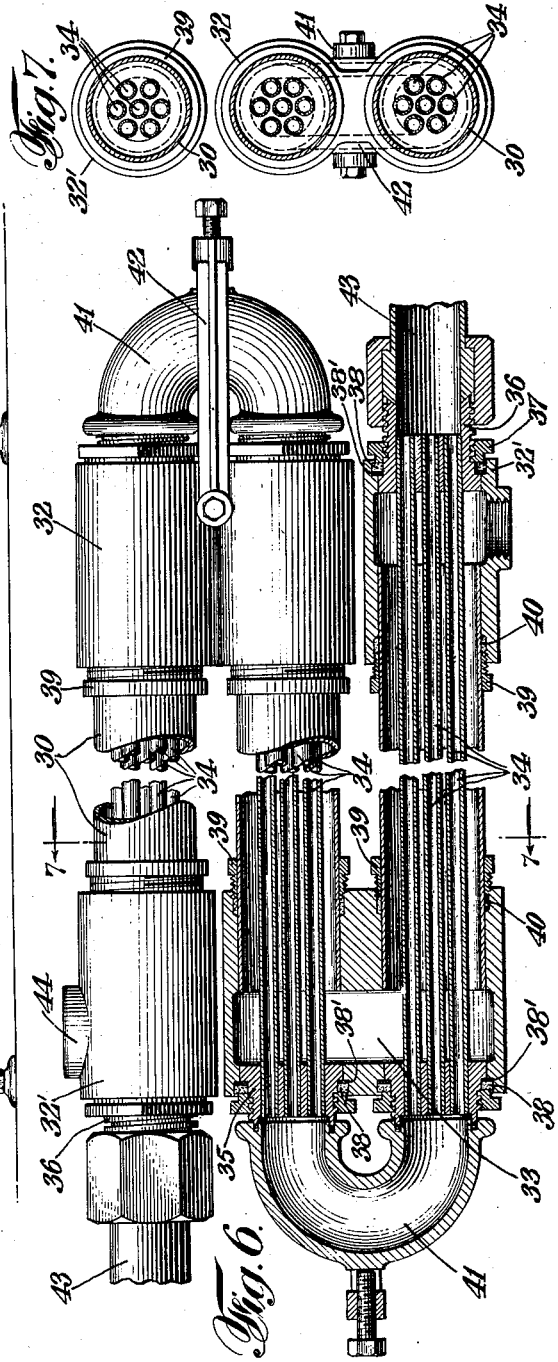
INVENTOR
Fritz G. Cornell Jr
BY
Kenyon & Kenyon
ATTORNEY Patented Apr. 7, 1931

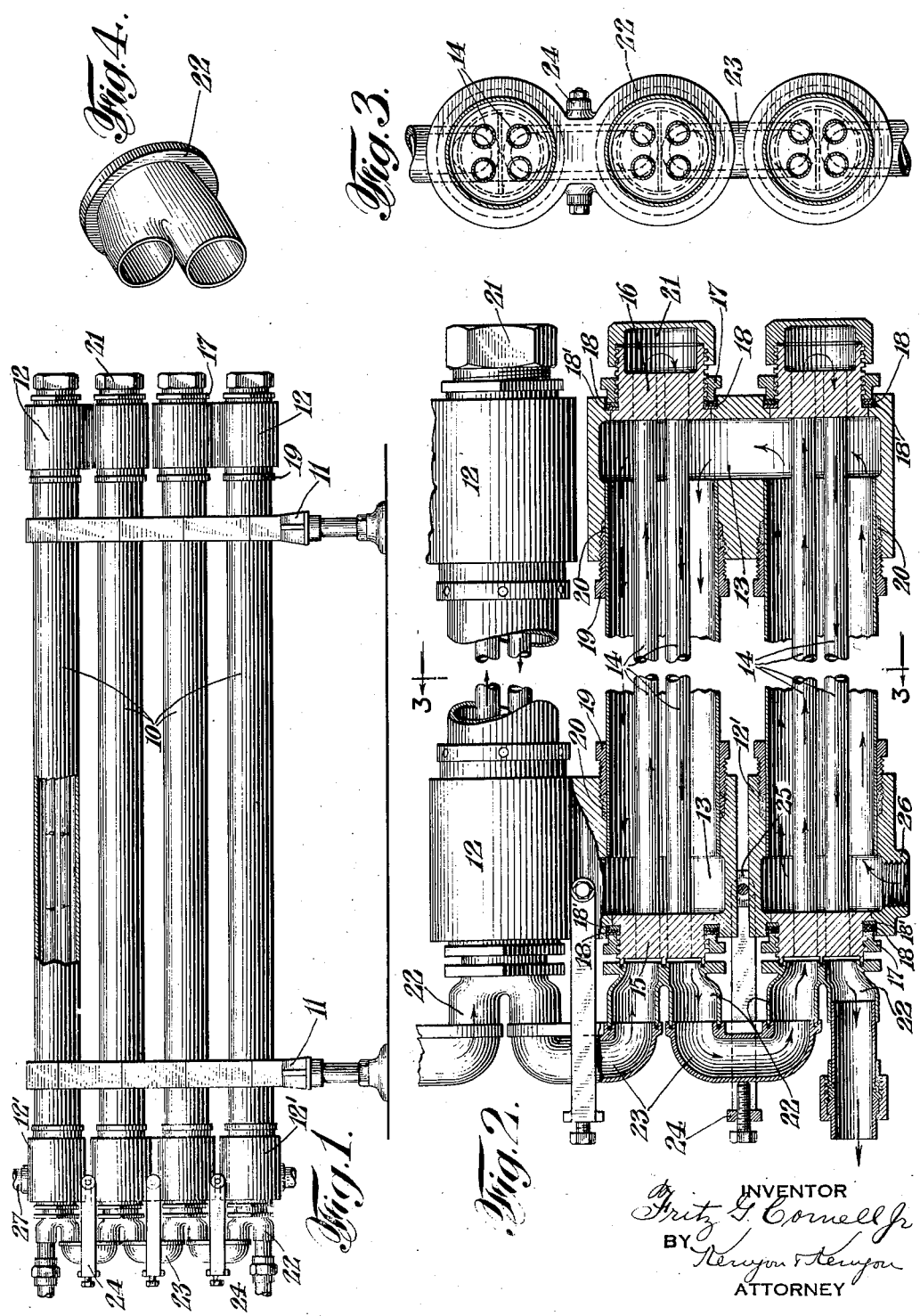

1,799,356

UNITED STATES PATENT OFFICE

FRITZ G. CORNELL, JR., OF CALDWELL, NEW JERSEY, ASSIGNOR TO JENSEN CREAMERY MACHINERY CO., OF BLOOMFIELD, NEW JERSEY, A CORPORATION OF NEW YORK

HEAT-EXCHANGE DEVICE

Application filed April 9, 1929. Serial No. 353,838. REISSUED

This invention relates to heat exchange devices and has for an object, a simple, inexpensive, compact, efficient and sanitary apparatus suitable for use either in heating or cooling milk, cream and other liquid products.

An apparatus embodying the invention comprises a plurality of substantially parallel pipes serially connected by means of headers slidably mounted on the pipes and having a fluid tight connection therewith and a cluster of tubes in each pipe. Tubes of one pipe are connected with the tubes of another pipe by conduits which are held in position by clamps supported by the headers. This arrangement permits relative expansion and contraction of the tubes and enclosing pipes without subjecting the apparatus to damaging strains or stresses. Milk or other liquid products are caused to flow through the tubes and cooling or heating liquid is caused to flow through the pipes around the tubes in the opposite direction or in the same direction as the milk. By the use of a plurality of small tubes for the milk, the efficiency of heat exchange between the heating or cooling fluid and the milk is very high due to the large area subject to the turbulent flow of milk. Moreover, in the apparatus above described, due to the heat exchange efficiency of the small tubes, there is no dead core of milk passing through the tubes with the result that the milk is uniformly cooled or heated.

In one type of apparatus, the tubes are divided into two or more groups which communicate with each other through a chamber provided at one end of the pipe in which they are arranged. The groups of tubes in each pipe communicate with similar groups in the adjacent pipes, one group of tubes of each pipe being connected to a group of tubes in the pipe ahead of it and the other group of tubes of said pipe being connected with the group of tubes behind it. Milk or other products flowing through the tubes is thus caused to travel out and back through the tubes in one pipe before it is transferred to a group of tubes in the next pipe. The heating or cooling fluid is caused to flow through the enclosing pipes around the tubes, the milk or other liquid products being introduced into the tubes at one end of the apparatus and the cooling or heating fluid being introduced into the pipes either at the same or the other end of the apparatus.

Other objects, novel features and advantages of this invention will be apparent from the following specification and accompanying drawings, wherein:

Fig. 1 is a side elevation of an apparatus embodying the invention.

Fig. 2 is an enlarged view partly broken away of a section of such apparatus.

Fig. 3 is a section on the line 3—3 of Fig. 2;

Fig. 4 is a perspective view of a fitting used in the apparatus.

Fig. 5 is a side elevation of a different embodiment of the invention.

Fig. 6 is an enlarged view partly broken away of such apparatus but with fewer pipes, and Fig. 7 is a sectional view on the line 7—7 of Fig. 6.

A plurality of parallel pipes 10 are supported by standards 11. These pipes are serially connected by headers 12, each header having bores for receiving the corresponding ends of a pair of pipes 10 and having a passageway 13 leading from one bore to the other. The free ends of the top and bottom pipes are provided with inlet and outlet sleeves 12'. A cluster of tubes 14 extends through each pipe 10, the ends of the tubes being inserted and fixed in apertures in plugs 15 and 16 which close the bores in the sleeves 12' and headers 12. Around each plug there is provided a gland 17 which bears against a gasket 18 and a ring 18', thereby forming a tight joint between the plug and header or sleeves in which it is arranged. Glands 19 surround the pipes 10 and are threaded into the bores of the headers 12 and sleeves 12'. These glands compress a packing 20 thereby producing a tight joint between the header and sleeves and the pipes.

Each of the plugs 16 is slightly recessed and is provided with a recessed cover 21 attached thereto. The recess in the cover forms a chamber by which one set of tubes 14 communicate with the other set of tubes within the same pipe. At their other ends, the tubes 14 communicate with passageways in a fitting 22 which engages the plug 15. Each fitting has two passageways and half of the tubes 14 communicate with one passageway and the other half with the remaining passageway. Conduits 23 provide communication between one passageway of one fitting 22 and a passageway of another fitting 22. The conduits 23 are held with their ends engaging the ends of the passageways in the fittings 22 by a yoke 24 pivoted to a bar or strap 25 which is carried by the adjacent headers. One passageway of the bottom fitting 22 acts as an outlet from the tubes, while one passageway of the top fitting acts as an inlet to the tubes or vice versa. The headers and plugs constitute caps for the ends of the pipes.

Milk or other liquid product to be cooled or heated is introduced into the tubes through the inlet and is first caused to pass out and back through the tubes in the top pipe. The milk passes out through one half of the tubes and into the chamber formed by the cap 21 from whence it flows back through the remaining group of tubes and is then transferred by means of the conduit 23 to a group of tubes in the next lower pipe and so on until the milk is eventually discharged from the outlet. The heating or cooling fluid is introduced into the bottom sleeve 12' through an inlet 26 and is caused to flow through the bottom pipe, then into the next upper pipe by passageway 13 and so on until it reaches the outlet 27 in the top sleeve 12' from which it is discharged from the apparatus or the direction of circulation may be reversed. The use of a large number of small tubes for the milk provides a large heat exchange surface and causes the milk to flow at a sufficiently high velocity to prevent scorching of the milk or other harmful action on it. Also dead cores of milk are prevented due to the efficiency of the turbulent action and the milk is thoroughly mixed at each end of a group of tubes before entering another group which insures uniform treatment.

Expansion or contraction of the tubes 14 does not produce any harmful strains on the apparatus. This is due to the fact that the headers are slidably mounted on the pipes 10. As the tubes 14 expand, the plugs 15 and 16 tend to move to the left and right and exert a pull on the yokes 24. This pull, instead of putting a strain on the apparatus merely is effective to slide the headers 12 and sleeves 12' on the pipe 10. When the tubes contract, the plugs exert pressure through the rings 18' and the headers and tend to return the same to normal position and maintain the yokes 24 in clamping relationship to the conduits 23. Because of the full floating relationship of the headers to the pipes, there is no opportunity of injury to the apparatus because of contraction and expansion strains. The apparatus takes up but little floor space and may be easily and quickly sterilized by the passage of steam through the same.

In the modification disclosed in Figs. 5, 6 and 7, a plurality of parallel pipes 30 are supported by standards 31 and are serially connected by headers 32 provided with passageways 33 connecting the bores in which the corresponding ends of a pair of pipes 30 are received. The free ends of the top and bottom pipes are provided with inlet and outlet sleeves 32'. A cluster of tubes 34 extends through each pipe 30, the ends of the tubes being inserted and fixed in apertures in plugs 35 and 36 which close the bores in the headers 32 and 32'. Around each plug there is provided a gland 37 which bears against a gasket 38 and ring 38' thereby forming a tight joint between the plug and header or sleeve in which it is arranged. Glands 39 surround the pipes 30 and are threaded into the bores of the headers 32 and sleeves 32'. These glands compress packings 40 thereby producing a tight joint between the headers and sleeves and the pipes. Return bend conduits 41 provide communication between the cluster of tubes in one pipe and the cluster of tubes in the next pipe. The ends of the conduit 41 have their ends engaging the plugs 35 and 36 and are held in such position by yokes 42 pivotally supported by the headers 32. The plugs 35 and 36 at the free ends of the top and bottom pipes are connected by unions or the like with conduits 43 by which milk or other liquid product to be cooled or heated is introduced into and withdrawn from the tubes 34. The sleeves 32' are provided with ports 44 through which the cooling or heating fluid is introduced into and discharged from the apparatus.

In this form of apparatus expansion or contraction of the tubes 34 does not produce any harmful effect. Expansion of the tubes 34 causes the plugs 35 and 36 to tend to move apart and thus exert a pull on the yokes 42. This pull, instead of being a strain on the apparatus merely is effective to slide the headers 32 on the pipes 30. When the tubes contact the plugs exert pressure through the gland and rings and tend to return the headers to normal position and maintain the yokes 42 in clamping relationship to the conduits 41. Because of the full-floating relationship of the headers to the pipes, there is no opportunity for injury to the apparatus by reason of the contraction and expansion of the tubes. This type of apparatus, as well as the type formerly described, is simple, inexpensive and efficient in heat transfer as well as being capable of being easily, quickly and efficiently sterilized by passage of steam through the same.

Although the invention has been disclosed as a multiple pipe apparatus, it is apparent that it may be embodied in a single pipe apparatus.

It is, of course, understood that various other changes may be made in the structure above described, without in any way departing from the spirit of the invention as defined in the appended claims.

I claim:

1. A device of the character described comprising a plurality of pipes, a cluster of tubes in each pipe, headers connecting in pairs corresponding ends of adjacent pipes, each header slidably receiving and sealing said ends, plugs sealing said headers and having apertures within which are fixed the ends of said tubes, passageways in said headers connecting the pipes, and conduits having their ends engaging corresponding plugs of adjacent pipes for providing communication between the tubes.

2. A device of the character described comprising a plurality of pipes, a cluster of tubes in each pipe, headers providing communication between corresponding ends of adjacent pipes in pairs, said headers having bores in which the ends of said pipes are slidably sealed and passageways connecting said bores, plugs sealing said bores and having apertures within which are fixed the ends of said tubes, return bend conduits having their ends engaging plugs in adjacent pipes, and means supported by said headers for clamping said conduits in position.

3. A device of the character described comprising a plurality of pipes, a cluster of tubes in each pipe, headers connecting in pairs corresponding ends of adjacent pipes, each header slidably receiving and sealing said ends, plugs slidably sealing said headers and having apertures within which are fixed the ends of said tubes, conduits having their ends engaging said plugs and providing communication between tubes of adjacent pipes, passageways in said headers connecting the pipes, and means supported by said headers for clamping said conduits in position.

4. In a device of the character described, a pipe, a plurality of tubes therein, fittings at the ends of said pipe, each fitting having a bore in which one end of the pipe is slidably received, plugs mounted in said fittings and having apertures within which are fixed the ends of said tubes, a conduit engaging one of said plugs, and means supported by a fitting for clamping said conduit to said plug.

5. A device of the character described comprising a plurality of pipes, a plurality of tubes in each pipe, headers connecting in pairs the corresponding ends of adjacent pipes, each header having bores in which ends of said pipes are slidably sealed, plugs slidably mounted in said headers and having apertures within which are fixed the ends of said tubes, conduits having their ends engaging said plugs and providing communication between tubes in adjacent pipes, passages in the headers connecting said bores, and means supported by said headers for clamping said conduits in position.

6. In a device of the character described, a pipe, a plurality of tubes in said pipe, fittings slidably receiving and sealing the ends of said pipe, and plugs mounted in said fittings, said plugs having apertures within which are fixed the ends of said tubes.

7. A device of the character described comprising a plurality of substantially parallel pipes, a plurality of tubes in each pipe, caps slidably sealing the ends of said pipes, said caps having passages connecting said pipes in series and apertures within which are fixed the ends of said tubes, and conduits having their ends engaging said caps to provide communication between tubes in adjacent pipes.

8. A device of the character described comprising a plurality of substantially parallel pipes, a plurality of tubes in each pipe, caps slidably sealing the ends of said pipes, said caps having passages connecting the pipes in series and apertures within which are fixed the ends of said tubes, conduits having their ends engaging said caps to provide communication between tubes of adjacent pipes, and means supported by said caps for clamping said conduits in position.

9. In a device of the character described, a plurality of substantially parallel pipes, a plurality of tubes in each pipe, said pipes having caps slidably sealing the same at one end, said caps having apertures in which are fixed the ends of said tubes and passages connecting said pipes in series, and conduits leading between the ends of tubes in adjacent pipes.

10. In a device of the character described, a plurality of substantially parallel pipes, a plurality of tubes in each pipe, said pipes having caps slidably sealing the same at one end, said caps having apertures in which are fixed the ends of said tubes and passages connecting said pipes in series, conduits leading between the ends of tubes in adjacent pipes, and means supported by said caps for clamping said conduits in position.

In testimony whereof, I have signed my name to this specification.

FRITZ G. CORNELL, Jr.